UNITED STATES PATENT OFFICE.

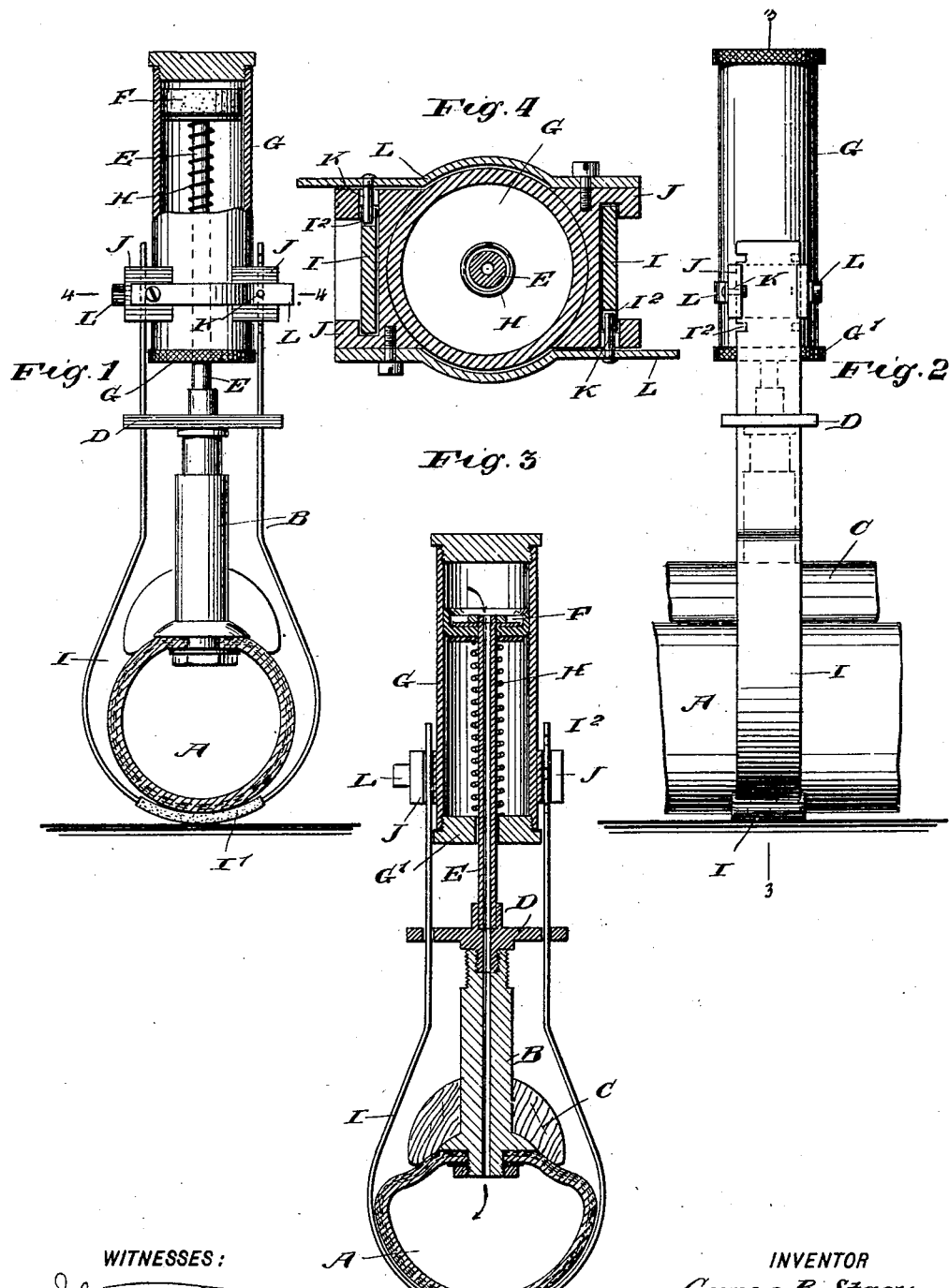

GEORGE BLAIR STACY, OF BOSTON, MASSACHUSETTS, ASSIGNOR TO ALEXANDER H. SPENCER, OF NEW YORK, N. Y.

AUTOMATIC TIRE-INFLATER.

SPECIFICATION forming part of Letters Patent No. 677,708, dated July 2, 1901.

Application filed November 13, 1900. Serial No. 36,355. (No model.)

*To all whom it may concern:*

Be it known that I, GEORGE BLAIR STACY, a citizen of the United States, and a resident of Boston, in the county of Suffolk and State of Massachusetts, have invented a new and Improved Automatic Tire-Inflater, of which the following is a full, clear, and exact description.

The invention relates to air-pumps operated automatically by motion derived from displacement of a tire under pressure.

The object of the invention is to provide a new and improved tire-inflater locked by the tire against movement while the tire is being inflated and arranged to be automatically actuated upon deflation of the tire by the device coming in contact with the ground upon every revolution of the wheel on which the device is applied.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a cross-section of the improvement as applied and with parts in elevation. Fig. 2 is a side elevation of the same. Fig. 3 is a cross-section of the same with the tire partly deflated, the section being on the line 3 3 in Fig. 2; and Fig. 4 is an enlarged sectional plan view of the improvement on the line 4 4 in Fig. 1.

Into a tire A opens the usual filling-valve B, extending through the rim C, as shown in the drawings, and on the inner end of said valve B screws a cross-head D, carrying the hollow stem E of a piston F, arranged in a cylinder G, normally held in the position shown in Figs. 1 and 2 by a spring H, pressing with one end against a stationary plunger F, the other end pressing against the head G' of a cylinder G. (See Fig. 3.)

The plunger F is of the usual cup shape, as indicated in Fig. 3, and air passes into the cylinder G through openings in the head G', and air from the cylinder G is forced by the plunger F through the hollow stem E and valve B into the tire A to inflate the same in case of a puncture or of leakage of air from the tire. For this purpose the cylinder G is actuated from the stationary plunger F, when the tire A becomes deflated, and in order to give the desired pumping movement to the cylinder G the following device is provided:

A stirrup I in the form of a flat band, having a covering I' at the bottom, spans the tire A and extends with its sides through bearings in the cross-head D to then connect with blocks J, secured to opposite sides of the cylinder G. Each of the sides of the stirrup I is formed with notches $I^2$ in the side edge, one of which is adapted to be engaged at a time by a pin K, held on a spring-catch L, secured to a block J, as will be readily understood by reference to Fig. 4. By the arrangement described the stirrup I can be readily used on tires A of different diameters by engaging the pins K with corresponding notches $I^2$ on the sides of said stirrup, it being understood that when the tire A is inflated, as shown in Fig. 1, the stirrup is locked to the block J by the pins K.

When the several parts are in the position shown in Figs. 1 and 2 and the tire A is completely inflated, then the pump is held in a locked position, as the rotation of the wheel does not affect the stirrup I, since the latter cannot move owing to the inflated tire, and consequently the pump is at a standstill. As soon as the tire becomes deflated the stirrup I moves upward whenever its covered portion I' passes over the ground, as the deflated tire now permits such upward movement of the stirrup. The upward movement of the stirrup causes a corresponding movement of the cylinder G on the stationary plunger F, whereby air in the lower portion of the cylinder G is forced past the plunger F into the upper end of the cylinder, and when the stirrup I leaves the ground upon the further rotation of the wheel then the spring H immediately forces the cylinder G outward toward the tire, so that the air previously drawn into the inner end of the cylinder is forced through the hollow stem E and valve B into the tire A to refill the same. As this operation is repeated during each revolution of the wheel, it is evident that air is pumped into the tire in such quantities as to overcome the amount of air leaking out, so that finally the tire becomes inflated and remains inflated as long as the wheel is in use. It is understood that the stroke of the cylinder G depends upon the amount of deflation of the tire—that is, it becomes longer upon deflation of the tire and less as the tire becomes inflated.

Having thus fully described my invention, I claim as new and desire to secure by Letters Patent—

1. An automatic tire-inflater, comprising a pump having a spring-pressed plunger with a hollow stem for removable attachment to the tire-valve, a pump-cylinder movable on said plunger, and a stirrup around the tire and connected with said pump-cylinder, as set forth.

2. An automatic tire-inflater, comprising a pump having a plunger with a hollow stem for removable attachment to the tire-valve, a pump-cylinder movable on said plunger, a stirrup around the tire and connected with said pump-cylinder, and a spring interposed between said plunger and one end of the said cylinder, as set forth.

3. An automatic tire-inflater, comprising a pump having a spring-pressed plunger with a hollow stem for removable attachment to the tire-valve, a pump-cylinder movable on said plunger, and a stirrup around the tire and connected with said pump-cylinder, the connection between the stirrup and cylinder being adjustable, as set forth.

4. An automatic tire-inflater, comprising a pump-cylinder, a piston in the cylinder and having a hollow rod, a spring surrounding the said rod between the piston and one cylinder-head, an apertured cross-head to which the piston-rod is secured, said cross-head being adapted to be secured to the tire-valve, and a stirrup adapted to pass around the tire and having its members passing through the cross-head and secured to the said cylinder, substantially as described.

5. In an automatic tire-inflater, the combination with a pump-cylinder, a spring-pressed piston in the cylinder and having a hollow rod, an apertured cross-head to which the piston-rod is secured, said cross-head being adapted for connection with the tire-valve, a stirrup adapted to pass around the tire and having its ends passing through the cross-head, and adjustable locking devices for securing the members of the stirrup to the pump-cylinder, substantially as described.

6. In an automatic tire-inflater, the combination with a pump-cylinder, and a spring-pressed piston in the cylinder and having a hollow piston-rod adapted to be secured to the tire-valve, of a stirrup adapted to pass around the tire and having its members working in guideways carried by the cylinder, and spring-catches for engaging the members of the stirrup to lock them in position, substantially as described.

In testimony whereof I have signed my name to this specification in the presence of two subscribing witnesses.

GEORGE BLAIR STACY.

Witnesses:
THEO. G. HOSTER,
EVERARD BOLTON MARSHALL.